Dec. 15, 1953    B. G. KLUGH ET AL    2,662,246
BRIQUETTING ROLL
Filed June 22, 1949    5 Sheets-Sheet 1

BETHUNE G. KLUGH
GEORGE C. PERRINE
*INVENTORS.*

BY Elmer P. Rucker
ATTORNEY

Dec. 15, 1953  B. G. KLUGH ET AL  2,662,246
BRIQUETTING ROLL
Filed June 22, 1949  5 Sheets-Sheet 2
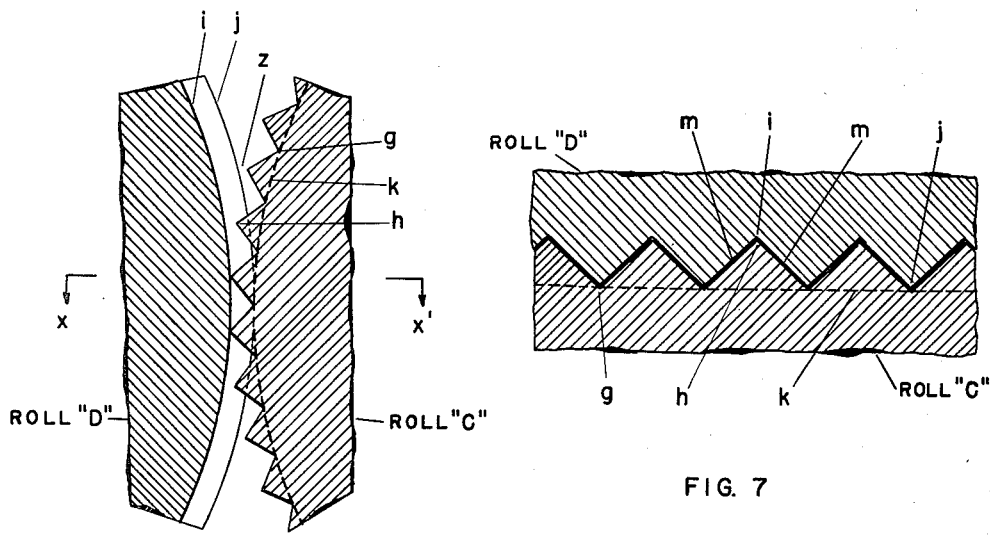
FIG. 6
FIG. 7
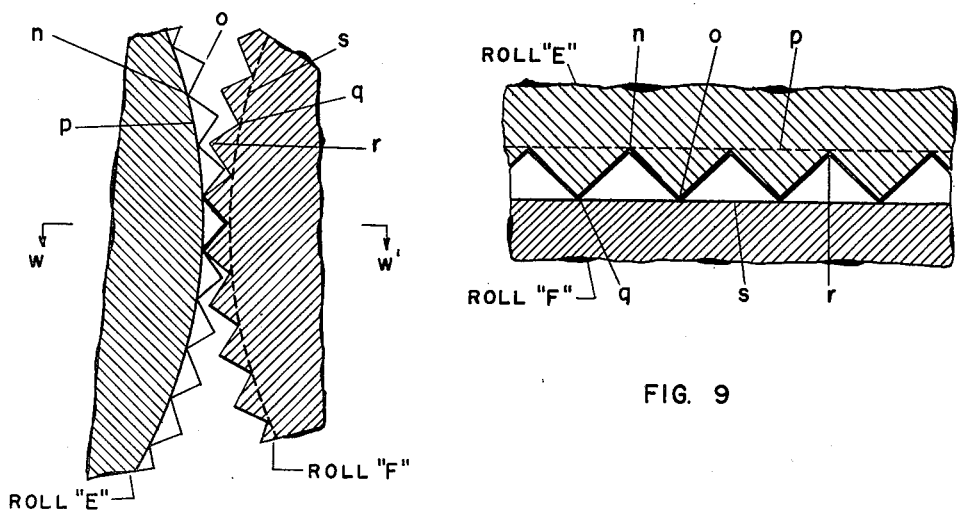
FIG. 8
FIG. 9
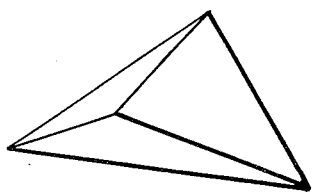
FIG. 10
BETHUNE G. KLUGH
GEORGE C. PERRINE
*INVENTORS.*
BY *Elmer P. Rucker*
ATTORNEY Dec. 15, 1953   B. G. KLUGH ET AL   2,662,246
BRIQUETTING ROLL
Filed June 22, 1949   5 Sheets-Sheet 3
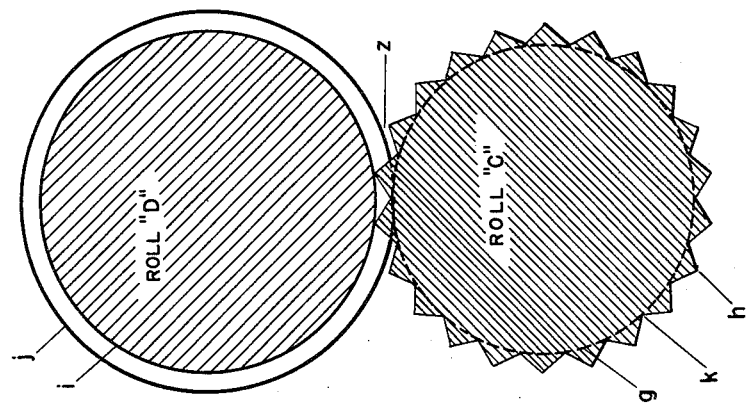
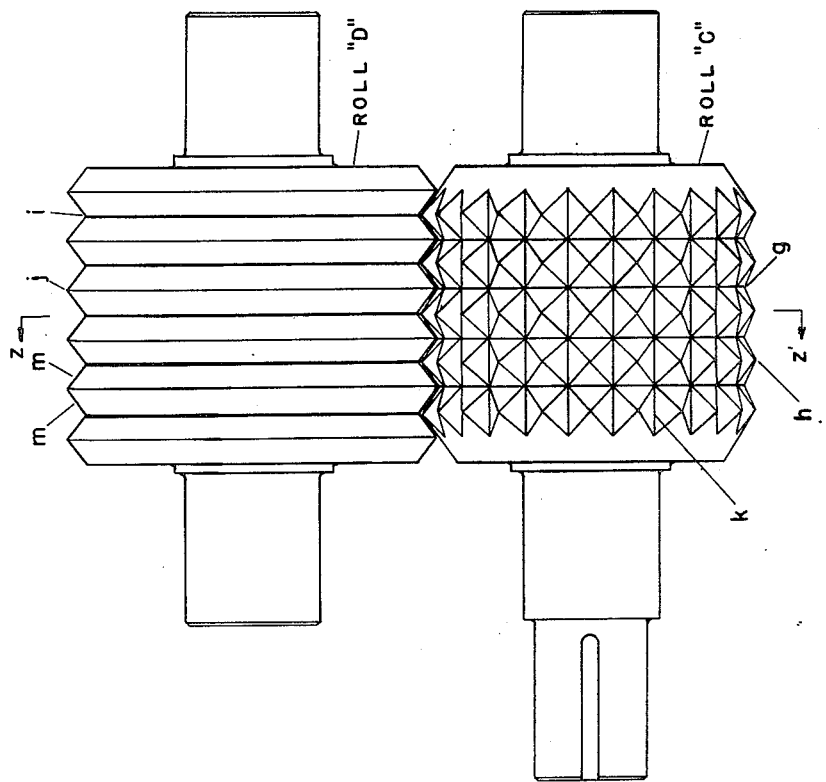
BETHUNE G. KLUGH
GEORGE C. PERRINE
INVENTORS.
BY Elmer P. Rucker
ATTORNEY Dec. 15, 1953    B. G. KLUGH ET AL    2,662,246
BRIQUETTING ROLL Filed June 22, 1949    5 Sheets-Sheet 4

BETHUNE G. KLUGH
GEORGE C. PERRINE
*INVENTORS.*

BY *Elmer P. Rucker*

ATTORNEY

Dec. 15, 1953     B. G. KLUGH ET AL     2,662,246
BRIQUETTING ROLL

Filed June 22, 1949     5 Sheets-Sheet 5

BETHUNE G. KLUGH
GEORGE C. PERRINE
*INVENTORS.*

BY Elmer P. Rucker
ATTORNEY

Patented Dec. 15, 1953

2,662,246

UNITED STATES PATENT OFFICE 2,662,246

BRIQUETTING ROLL

Bethune G. Klugh and George C. Perrine, Anniston, Ala., assignors to Monsanto Chemical Company, St. Louis, Mo., a corporation of Delaware Application June 22, 1949, Serial No. 100,628

9 Claims. (Cl. 18—21)

This invention relates to an improvement in design of briquetting rolls effecting lower initial investment cost, decreased maintenance expense, and advanced characteristic quality of product as compared with that hitherto obtainable in available equipment for this purpose.

While numerous modifications of form design, and types of roll briquetting presses have been developed, built and tried during the past half century in various industrial applications wherein such equipment is needed, the production and use in recent years has been almost solely of a single conventional type. This consists in principle of two duplicate rolls, revolving axially parallel in the same direction at the point of contact, both being driven at exactly the same rate and each having matched depressed pockets below the face of the roll, coacting upon material fed into the tangential contacting zone, to form compressed aggregates of uniform shape and size thereby. A number of modifications of the sizes, shapes and forms of the matching depressions or pockets are made and employed for briquetting widely varying materials for many functions. However, all follow the same general matched pocket mechanical design principle.

Despite its substantially universal adoption in industrial applications concerned, this conventional matched pocket type of briquetting roll press has definite limitations in its functional performance, in economy of investment requirement, in relative production rate capacity, in mechanical maintenance service, and in operating effects.

In any given pair of this type of briquetting rolls, the two elements must be of exactly the same diameter, the forming pockets require exact spacing, duplicate shape and perfect coaction in alignment. This requires accurate milling machine tools and cutters, extreme skill, and expensive mechanisms to put them in operating condition. The forming pockets with coacting common spacing edges are subject to wear in service, so that obviously the retooling of each of the individual pockets demands manual operation by highly skilled mechanics with special expensive tools. It is further obvious that in such a briquetting roll type unit the material fed into the space above the tangentially disposed contacting faces does not naturally fill the pockets by gravity since the pockets are in an inclined position. This usually requires an auxiliary precompression device to force the complete filling of these pockets in order to produce a briquette of the required density and stability. This combination of functional retarding conditions tends to produce a briquette of incoherent structure. It is further apparent that when material is fed into the matched pockets of the coacting rolls, there is a strong cohering effect to the surfaces of inner area of each pocket. Likewise, it is evident that if the coherence to one pocket surface is stronger than that of the other matched pocket, the tendency will be for the following edge of the released pocket to shear the cohering briquette as the rolls open up.

On the other hand, when the surfaces of both matched pockets effect coherence to the briquette so formed, the tendency will be to shear the briquette in two, so that the respective halves pass around the cycle and prevent further forming until removed. In such case, the respective half briquettes have their surfaces level with that of the periphery of the rolls, and thus being fully depressed below the surface, there is no practicable means of removing the so cohering segments during the operation of the unit. The breaking of the so formed briquette in process of its formation in the pockets is generally due to its insufficient compression to effect uniform and adequate tensile strength to overcome the cohesion exerted by the inner surface of the respective pocket. Designers of this type of briquetting rolls insist upon the pocket contour of circular arc form in direction of rotation to effect "creep" or movement along the curved path to cause the briquette to discharge. This requirement obviously effects concomitant abrasion of the pocket surface and spacing edges. All the above described inherent conditions, limitations and defects in principle contribute to uneconomical industrial effects.

The objective of the herein described invention of providing corrective means therefor has been accomplished with full proof in its application to commercial practice.

The description which follows provides comprehensive information of the distinctive features of this invention, its fundamental principles, practical and theoretical, as compared with that of the present state of the art, all adequate for its full use by any one either skilled in the art or conversant with mechanical application involved.

Graphic demonstration of the matched pocket type of briquetting rolls appears needless herein, since any one actively or even academically interested in this function has a clear understanding of the structure. The above described defects of the matched pocket type of briquetting rolls are apparently accepted as a status quo, without any serious effort being made to correct same.

Graphic description is, however, desirable in the case of a departure from the conventional matched pocket type, with detail defining of the defects developed therein. This design was used in a practicable commercial installation, so that its characteristic limitations were subject to full test and proof. This is the only known commercial installation of record of this type of briquetting roll that is entirely different from the matched pocket type except that of the invention hereinafter described. This new departure type is shown in Figures 1, 2, 3, 4 and 5, in which the same reference characters refer to the same parts in these several figures.

Figure 1 is a segment of a radially cut section through the pair of rolls in operating assembly position. Figure 2 shows two perspective views of the briquette produced by these rolls. Figure 3 is a perspective surface development of the cross grooved roll here designated as roll A. Figure 4 is a section of the tangentially contacting rolls through line $y$—$y'$ in Figure 1. Figure 5 is a perspective surface development of the plain ridged roll here designated as roll B.

Roll B has angular projecting peripheral ridges $a$ equally spaced about the cylindrical valleys $b$ which are uniformly distributed across the surface of the roll.

Roll A has grooves $c$ of same dimensional spacing and form as ridges $a$ of roll B, which elements mesh in operation. Longitudinally over the face of roll A and through the grooves $c$, there are cut circular segmental sectional grooves $d$ of the same depth, with peripheral separators $e$, which operate in close shearing contact with bottom peripheral surface of valleys $b$ in roll B. Material is fed into the trough space $f$, formed by tangential contacting of the respective rolls A and B. This material is currently flowed and drawn into cross groove $d$, which with revolving of the rolls is compressed radially by closure through valley surface $b$, and is simultaneously compressed laterally by closure of the sloping surfaces of the ridges $a$ of roll B.

The more effective pressure exerted upon the entire body of the briquette in formation by this design over that of the conventional matched pocket type is obvious by noting the above described drawings. The above described functional weaknesses and defects of the matched pocket type are in a measure corrected by this design. The natural gravity filling of the briquette pockets, the coordinated multidirectional pressure effects and the open end position of the formed briquette which facilitates easier removal from the cohering cylindrical plane surface are all superior functionally to corresponding items in the matched pocket types. In construction and mounting, this type has further advantages in that the peripheral grooves and ridges, and also the cross grooves of cylindrical segmental form are subject to machining with standard straight line movement versus that of the below surface pockets. The lateral alignment of this later type is automatically obtained in the coordination of the two rolls in service. A further advantage is that only one of the rolls need be driven, thus simplifying the mounting.

Despite these obvious advantageous features of this groove type over that of the old conventional matched pocket type, defective characteristics developed which defeated its economic service, and resulted in its discontinuance in production and further use. The circular form of the cross grooves was theoretically considered necessary to permit "creep" movement of the briquette in formation in order to effect its release. This movement along the surface caused rapid wear on the lips or peripheral separators $e$. The grinding of the cross cylindrical grooves $d$, in maintaining their dimensions, demands use of grinding wheels of exactly the circular size of these grooves so that a wheel can be used for this service only until it wears to a size smaller than the required dimension. This requires an inordinate time for the grinding and also prohibitive cost for this maintenance.

From the foregoing description of the two types of briquetting roll design available for industrial application, it is obvious that the defects impose an economic limitation upon this method of agglomeration in some needed fields. This incentive for essential improvement motivated the study, experimentation, and development which resulted in the invention hereinafter described.

This new design is called the angle type, descriptive of its geometrical principle of forming elements which effect the advantages over those briquetting roll assemblies previously employed.

Figures 6–12 inclusive illustrate the novel angle type briquetting roll assemblies of the instant invention which yield tetrahedrally shaped briquettes as indicated in Figure 10.

Figure 6 is a radial cross section of a circular segment of the briquetting rolls C and D in tangential operating contacting position.

Figure 7 is an axial section of the briquetting rolls C and D along the bisecting plane of line X—X' in Figure 6.

Figure 8 is a radial cross section of a circular segment of briquetting rolls E and F in tangential operating contacting position. This embodiment of the invention is similar to that illustrated in Figure 6 except that roll D of the latter is substituted by a duplicate of roll C.

Figure 9 is an axial section of briquetting rolls E and F along line $w$—$w'$ of Figure 8.

Figure 10 is a perspective outline of the tetrahedral briquette produced by briquetting roll assemblies shown in Figures 6–9 inclusive.

Figure 11 shows the assembly position of briquetting rolls C and D in perspective outline.

Figure 12 is a cross section on line $z$—$z'$ of the assembly of Figure 11, through the pyramidal peaks of roll C and groove of roll D.

Figure 1:
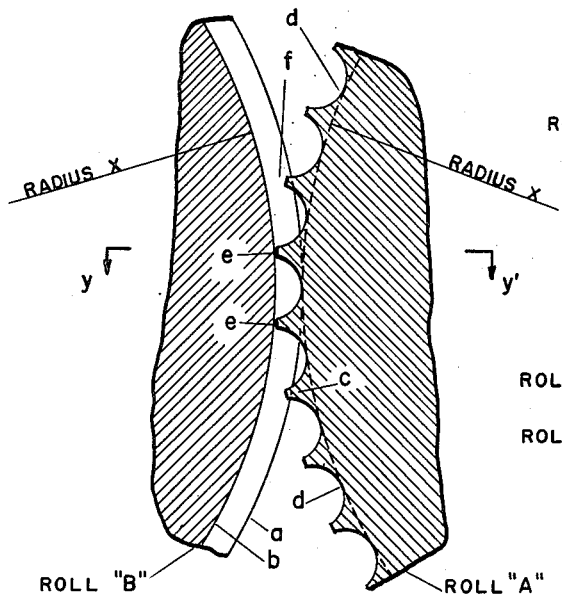
Figure 2:
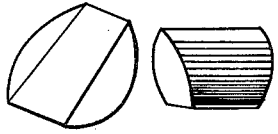
Figure 3:
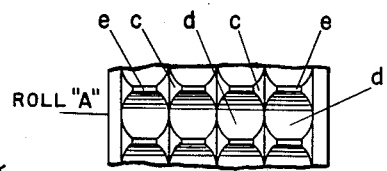
Figure 4:
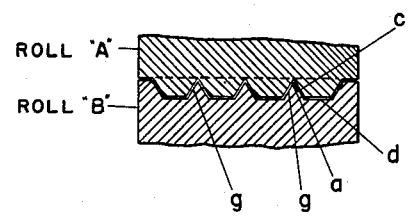
Figure 5:
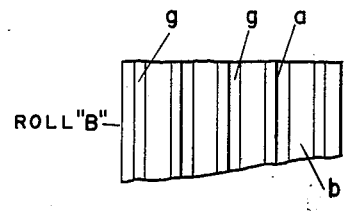

Referring more particularly to Figures 6–12 inclusive, it will be noted that each roll has parallel plane angular surface grooves and ridges meshing and mating with each other.

In roll C of Figures 6, 7, 11 and 12, the peripheral grooves are designated by symbol $g$ and the adjacently formed ridges by symbol $h$. In roll D, the peripheral grooves are indicated by symbol $i$ and the corresponding ridges by reference character $j$.

Roll C has cross grooves $k$ similar in form, shape and depth to the peripheral grooves, which are cut in sequential order around the entire peripheral zone. These cross grooves intersecting the similar dimensional peripheral grooves naturally develop quadrilateral pyramids in geometrically arranged pattern as shown in Figure 11.

The material under briquetting treatment is fed into the space $z$ formed by the tangentially contacting rolls C and D. Obviously this material naturally tends to be drawn into the angular pocket spaces by the movement of the oppositely revolving rolls. The material so fed into the open pockets is compressed laterally from opposing sides simultaneously by closure of the sloping surfaces $m$ of roll D against the cross grooved formed pockets $k$ in roll C.

This design provides greatly simplified means of forming the functional parts of these rolls over that of the conventional matched pocket type of briquetting roll assembly or over that of the type illustrated by Figures 1–5 inclusive. The grooves in rolls C and D, being essentially duplicate in form, are subject to cutting, milling or grinding by means of a standardized tool or wheel. The cross grooves $k$ of roll C are subject to cutting by standard gear cutting machine tools and with a standardized forming tool.

With proper relation of size of the forming coordinate grooves and ridges with the roll diameter, the ultimate compressive closures will be complete with gradient pressure exerted multi-directionally upon all surfaces of the briquette. This results in a briquette having the density and strength required to overcome the cohesion of the surfaces. It will also be noted that the formed briquette, after passing from its compression position, has two full sides exposed, thus providing the conditions for continuously and automatically ejecting the briquette if it is found necessary to do so. This provision for continuously removing cohering briquettes currently with the production operation is obviously not of practical application with the depressed matched pocket type.

The functional compressive action with this type of briquetting roll is obviously exerted in wedge like action upon the material under treatment rather than by the creep sliding action as in the two other types above described. This tends to produce less wear and flowing rate of the metal used in roll construction.

The simplified and more economical fabrication of the functional forming of this angle type roll design permits a wider range of selection of materials of construction than with the expensive tooling required for the matched pocket type.

The costly initial pocket tooling and expensive re-tooling when worn, in case of the matched pocket type, demands a high cost abrasion resistant alloy metal. In the angle type, the initial forming and reforming after wear is so simple and economical that low cost materials may be used, with relatively inexpensive repairs or replacement.

In the design and assembly described, only the cross grooved roll need be driven. The plain ridged and grooved member may float freely in its coordinating compressive function. The coacting corresponding ridge and grooves of the two respective rolls avoids the necessity of mechanical lateral alignment as in matched pocket type. Thus, the eliminated expense items of synchronous drive and alignments are a contribution to economy in this service.

The briquetting roll assembly illustrated in Figures 8 and 9 operates in a manner similar to the machine shown in Figures 6 and 7 except that both rolls E and F are cross grooved and driven synchronously. This results in the production of briquettes on both rolls and thus substantially doubles the capacity of the briquetting assembly.

In roll E, the peripheral grooves are designated by reference character $n$, the adjacently formed ridges by $o$ and the cross grooves by $p$. In roll F, the corresponding peripheral grooves, adjacently formed ridges and cross grooves are indicated by reference characters $q$, $r$ and $s$ respectively.

If the cross grooves on rolls E and F are placed closely adjacent to each other as illustrated in roll C, it is necessary that the relation of the diameter of the roll to depth of the groove be adjusted so that the closure of the corresponding pockets of respectively adjacent elements is substantially complete, and also that the dimensions of the grooves and resulting forming pockets be of extreme accuracy. If the closure of the material under briquette forming compression is not completely tight, a portion of the material will be extruded through the small gap from the pocket back into the feed bed with the result that the briquette does not receive adequate compression to effect the required strength for its discharge against the cohesive influence of the pocket fore and aft surfaces. In such case, the briquettes tend to break and leave a portion in the pocket.

The foregoing difficulty may be overcome by spacing the cross grooves so that the enclosing sides of the remaining section of the peripheral grooves will lap over the edges bounding the forming pocket and thus hold the material in place until the full compression cycle is completed. This modification of the instant invention is illustrated in Figures 13–15 inclusive.

Figures 13, 14:
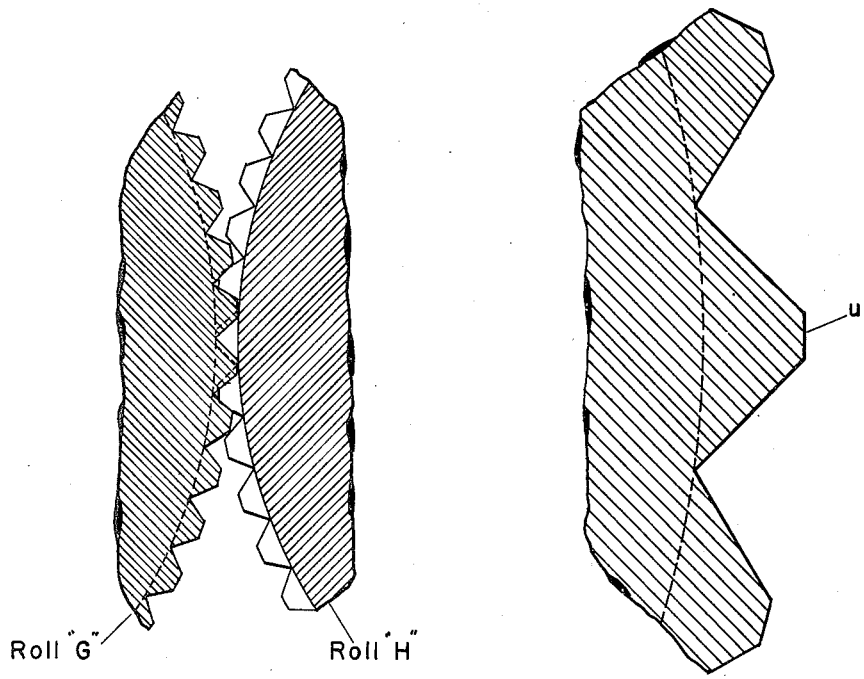

Figure 13 is one full size sectional view of an illustrated case, showing the form of the cross grooves which are so spaced as to provide overlapping closure with the two coacting rolls in functional service. In this embodiment, it will be noted that the angular surfaces forming the interrupted peripheral ridges intersect each other in such a manner as to form a line $u$ and not a point $h$ as in Figures 6–9 and 11–12 inclusive.

Figure 14 shows the contacting relation of the cross grooves of briquetting rolls G and H which are in tangential operating contacting position.

Figure 15:
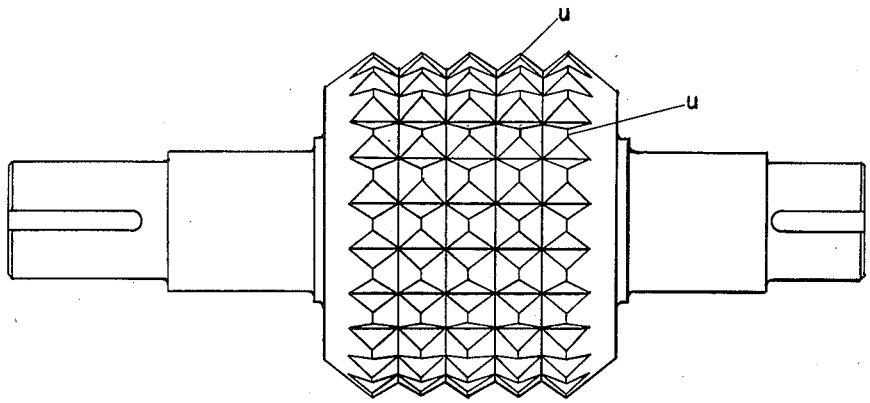

Figure 15 is a perspective outline of one of the briquetting rolls, the other roll being of the same effect for this view.

The functional performance of this embodiment of the invention is the same as that for the single forming roll. In this case, both rolls will be driven in synchronous rotation and relation of the mutually coacting forming elements. The rolls are set so that the forming pockets of G and H are alternated on their peripheral compression sequences. It is not possible to illustrate this relation of coacting forming sections and surfaces on a two dimensional drawing, but the above description in connection with Figures 13–15 inclusive appears adequate to apprise one skilled in the art how to practice the present invention.

Another variation consists in the same peripheral ridges and grooves with same relative slope angles adjacently aligned across the face of the roll, but with the cross grooves having a regular trapezoidal cross section instead of triangular as in previous descriptions. That is, instead of these cross grooved pockets sloping to a sharp edge at the bottom, the two inwardly sloping triangular sides are separated and terminate on edges of a rectangular plane. The briquette formed by this combination is a symmetrical pentahedron, with outwardly sloping triangular ends to an elongated apex. With this modification of the cross groove cross sectional form, a briquette of over twice the volume of that with the same size triangular cross groove is made, and yet with about the same cross sectional dimension. This latter dimension is important in thermal treatment of the briquette product to obtain favorable heat transfer rates. This variation is illustrated in Figures 16-19 inclusive.

Figures 16, 17:
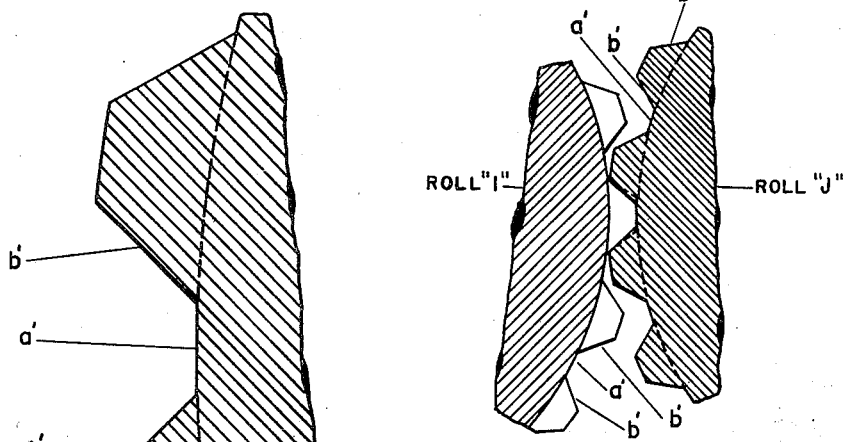

Figure 16 shows a cross sectional view of single cross groove of one of the rolls of the briquetting assembly.

Figure 17 is a partial section of the tangentially contacting rolls I and J, showing how the cross grooves and ridges intermesh with each other.

Figure 18:
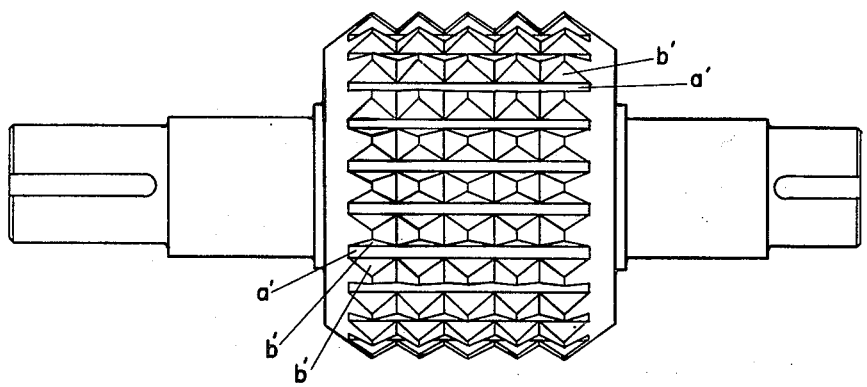

Figure 18 is a perspective view of one of the briquetting rolls, the other roll being identical for this view.

Figure 19:
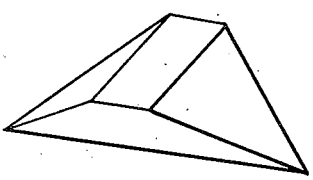

Figure 19 shows a perspective view of the briquette produced by the briquetting assembly of Figures 16-18 inclusive.

In these figures the base of the briquette forming pocket is indicated at $a'$, the end sloping sides at $b'$. Other than these designated dimensions, the roll cutting remains the same as in the previous descriptions. This variation with the elongation of the briquette forming functional item may be employed with only one roll with cross grooves, in which case, the cross grooves would be cut closely adjacent in peripheral sequence; or it may be applied to both rolls in which the cross grooves would be spaced to provide for the overlapping closure by the respective coacting forming sections of the two rolls.

In all of the foregoing modifications of the instant invention, the preferred angle between the surfaces of the briquette forming elements, both in the peripheral and cross grooves is 98°. This angle may be effectively as small as about 85°, but this obviously does not permit grinding with plain cylindrical wheels as is the case with an angle in excess of 90°. This angle may be extended to 105° without impairing the briquette compression efficiency.

The improvements herein set forth are not limited to the precise construction and arrangements shown and described since they may be embodied in various forms and modifications without departing from the spirit and scope of the invention.

What we claim is:

1. A briquetting roll assembly comprising in comibnation a pair of opposed contacting rolls which rotate in the same direction at the point of contact, each roll having uniformly spaced parallel V-shaped peripheral grooves and adjacent parallel peripheral ridges, at least one of said rolls having axial angular grooves intersecting said V-shaped peripheral grooves and peripheral angular ridges at right angles on said one roll and said peripheral ridges on the other roll closely intermeshing with the peripheral grooves on said one roll at the point of contact of said rolls and providing lateral closures for the axial grooves on said one roll and thereby forming a series of completely separated mold cavities on said one roll.

2. A briquetting roll assembly comprising in combination a pair of opposed contacting rolls of substantially the same diameter which rotate in the same direction at the same or substantially the same peripheral speed at the point of contact, each roll having uniformly spaced parallel V-shaped peripheral grooves and adjacent parallel peripheral ridges, at least one of said rolls having axial angular grooves intersecting said V-shaped peripheral grooves and peripheral angular ridges at right angles on said one roll and said peripheral ridges on the other roll closely intermeshing with the peripheral grooves on said one roll at the point of contact of said rolls and providing lateral closures for the axial grooves on said one roll and thereby forming a series of completely separated mold cavities on said one roll.

3. A briquetting roll assembly as defined in claim 2 in which the angle included by said grooves in each roll has a value within the limits of 85° to 105°.

4. A briquetting roll assembly as defined in claim 2 in which the angle included by said grooves in each roll is greater than 90°.

5. A briquetting roll assembly as defined in claim 2 in which the angle included by said grooves in each roll is about 98°.

6. A briquetting roll assembly comprising in combination a pair of opposed contacting rolls of substantially the same diameter which rotate in the same direction at the same or substantially the same peripheral speed at the point of contact, each roll having uniformly spaced parallel V-shaped peripheral grooves and adjacent parallel peripheral ridges, one of said rolls having axial angular grooves intersecting said V-shaped peripheral grooves and peripheral angular ridges at right angles on said one roll and said peripheral ridges on the other roll closely intermeshing with the peripheral grooves on said one roll at the point of contact of said rolls and providing lateral closures for the axial grooves on said one roll and thereby forming a series of completely separated mold cavities on said one roll.

7. A briquetting roll assembly comprising in combination a pair of similar opposed contacting rolls which rotate in the same direction and at the same peripheral speed at the point of contact, each roll having uniformly spaced parallel V-shaped peripheral grooves, adjacent parallel peripheral ridges and parallel axial angular grooves intersecting said V-shaped peripheral grooves and peripheral angular ridges at right angles on each roll and said peripheral ridges on each roll closely intermeshing with the peripheral grooves on the other roll at the point of contact of said rolls and providing lateral closures for the axial grooves on said other roll and thereby forming a series of completely separated mold cavities on said other roll.

8. A briquetting roll assembly comprising in combination a pair of similar opposed contacting rolls which rotate in the same direction and at the same peripheral speed at the point of contact, each roll having uniformly spaced parallel V-shaped peripheral grooves, adjacent parallel angular peripheral ridges and parallel axial V-shaped grooves intersecting said V-shaped peripheral grooves and peripheral angular ridges at right angles on each roll and said peripheral ridges on each roll closely intermeshing with the peripheral grooves on the other roll at the point of contact of said rolls and providing lateral closures for the axial grooves on said other roll and thereby forming a series of completely separated mold cavities on said other roll, said angular surfaces of said peripheral ridges on each roll terminating in a line lying in a plane defined by the outer periphery of each roll.

9. A briquetting roll assembly comprising in combination a pair of similar opposed contacting rolls which rotate in the same direction and at the same peripheral speed at the point of contact, each having uniformly spaced parallel V-shaped peripheral grooves, adjacent parallel angular peripheral ridges and parallel axial angular grooves of trapezoidal cross section intersecting said V-shaped peripheral grooves and peripheral angular ridges at right angles on each roll and said peripheral ridges on each roll closely intermeshing with the peripheral grooves on the other roll at the point of contact of said rolls and providing lateral closures for the axial grooves on said other roll and thereby forming a series of completely separated mold cavities on said other roll.

BETHUNE G. KLUGH.
GEORGE C. PERRINE.

References Cited in the file of this patent

UNITED STATES PATENTS

| Number | Name | Date |
|---|---|---|
| 196,100 | Newell | Oct. 16, 1877 |
| 373,134 | Duvall | Nov. 15, 1887 |
| 781,781 | Milne | Feb. 7, 1905 |
| 1,074,824 | Wadsworth | Oct. 7, 1913 |
| 1,954,635 | Leonard, Jr. | Apr. 10, 1934 |
| 1,986,365 | Scholz | Jan. 1, 1935 |
| 2,093,407 | Baker | Sept. 21, 1937 |
| 2,378,481 | Hutchings | June 19, 1945 |

FOREIGN PATENTS

| Number | Country | Date |
|---|---|---|
| 418 | Great Britain | 1898 |
| 10,686 | Great Britain | 1889 |
| 316,067 | Germany | Nov. 20, 1919 |
| 402,279 | Great Britain | Nov. 30, 1933 |
| 597,115 | Austria | May 17, 1934 |
| 615,840 | Germany | July 13, 1935 |
| 636,302 | Germany | Oct. 6, 1936 |
| 659,920 | Germany | May 13, 1938 |
| 695,627 | Germany | Aug. 30, 1940 |
| 704,434 | France | Feb. 23, 1931 |